United States Patent
Namou et al.

(10) Patent No.: US 10,020,755 B2
(45) Date of Patent: Jul. 10, 2018

(54) APPARATUS FOR DISCHARGING A HIGH-VOLTAGE BUS

(71) Applicant: GM GLOBAL TECHNOLOGY OPERATIONS LLC, Detroit, MI (US)

(72) Inventors: Andrew J. Namou, West Bloomfield, MI (US); Mohammad N. Anwar, Van Buren Township, MI (US); Ahmad Albanna, Dearborn Heights, MI (US); Syed M. Kadry, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/059,971

(22) Filed: Mar. 3, 2016

(65) Prior Publication Data

US 2017/0257039 A1  Sep. 7, 2017

(51) Int. Cl.
*H02M 7/537* (2006.01)
*H02P 27/06* (2006.01)

(52) U.S. Cl.
CPC ............ *H02M 7/537* (2013.01); *H02P 27/06* (2013.01)

(58) Field of Classification Search
USPC ....................................................... 318/504
See application file for complete search history.

(56) References Cited

U.S. PATENT DOCUMENTS

| | | | | |
|---|---|---|---|---|
| 6,315,081 B1* | 11/2001 | Yeo | ........................... | B66B 5/02 187/290 |
| RE43,956 E * | 2/2013 | King | ................... | B60L 11/1864 307/10.1 |
| 8,612,073 B2* | 12/2013 | Fuji | .......................... | B60L 3/00 307/10.1 |
| RE45,431 E * | 3/2015 | King | ................... | B60L 11/1864 307/10.1 |
| 9,041,327 B2* | 5/2015 | Breitzmann | .............. | H02P 3/22 318/400.22 |
| 2007/0159007 A1* | 7/2007 | King | ................... | B60L 11/1864 307/71 |
| 2010/0214055 A1* | 8/2010 | Fuji | .......................... | B60L 3/00 340/3.1 |
| 2010/0250194 A1* | 9/2010 | Newhouse | ............ | B60R 16/023 702/183 |

(Continued)

*Primary Examiner* — Eduardo Colon Santana
*Assistant Examiner* — Devon Joseph
(74) *Attorney, Agent, or Firm* — Quinn IP Law

(57) ABSTRACT

A power inverter includes a multi-phase inverter circuit electrically connected to positive and negative conductors of the high-voltage bus. A bi-stable switch is electrically connected in series with a discharge resistor between the positive and negative conductors of the high-voltage bus, and a capacitor is electrically connected between the positive and negative conductors of the high-voltage bus. First and second trigger circuits are in communication with a gate of the bi-stable switch, and first and second contactors are controllable to electrically connect a respective one of the positive and negative conductors of the high-voltage bus to the high-voltage DC power source. The bi-stable switch is controllable to provide a low-impedance electric current flow path through the discharge resistor between the positive and negative conductors of the high-voltage bus in response to an activation signal from one of the first and second high-voltage DC contactor circuits.

17 Claims, 3 Drawing Sheets

(56) References Cited

U.S. PATENT DOCUMENTS

| | | | | |
|---|---|---|---|---|
| 2012/0187775 | A1* | 7/2012 | Nordstrom | B60L 3/0069 307/112 |
| 2013/0181686 | A1* | 7/2013 | Ueda | H02J 7/0031 320/166 |
| 2014/0286060 | A1* | 9/2014 | Sugiura | B60L 11/1803 363/56.01 |
| 2014/0300298 | A1* | 10/2014 | Liu | H02P 3/22 318/380 |
| 2014/0368143 | A1* | 12/2014 | Breitzmann | H02P 3/22 318/400.22 |
| 2016/0059702 | A1* | 3/2016 | Minesawa | B60L 3/0046 307/10.1 |
| 2016/0064956 | A1* | 3/2016 | Minesawa | B60L 3/04 320/166 |

* cited by examiner

APPARATUS FOR DISCHARGING A HIGH-VOLTAGE BUS

TECHNICAL FIELD

The disclosure relates to discharging electrical energy stored on a high-voltage bus, including a system wherein the high-voltage bus transfers electric power to a power inverter.

BACKGROUND

Power inverter circuits may include a bulk capacitor arranged across a high-voltage bus to provide electrical stability and supplemental electric power storage. When the power inverter circuit is not in operation, or in certain other circumstances, it may be desirable to discharge the high voltage bus including the bulk capacitor.

SUMMARY

A power inverter electrically connected to a high-voltage DC power source via a high-voltage bus is described. The power inverter includes a multi-phase inverter circuit electrically connected to positive and negative conductors of the high-voltage bus. A bi-stable switch is electrically connected in series with a discharge resistor between the positive and negative conductors of the high-voltage bus, and a capacitor is electrically connected between the positive and negative conductors of the high-voltage bus. First and second trigger circuits are in communication with a gate of the bi-stable switch, and first and second contactors are controllable to electrically connect a respective one of the positive and negative conductors of the high-voltage bus to the high-voltage DC power source. The first and second high-voltage DC contactors are in communication with a respective one of the first and second trigger circuits. The bi-stable switch is controllable to provide a low-impedance electric current flow path through the discharge resistor between the positive and negative conductors of the high-voltage bus in response to an activation signal that is communicated from one of the first and second high-voltage DC contactor circuits to the bi-stable switch via one of the first and second trigger circuits.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
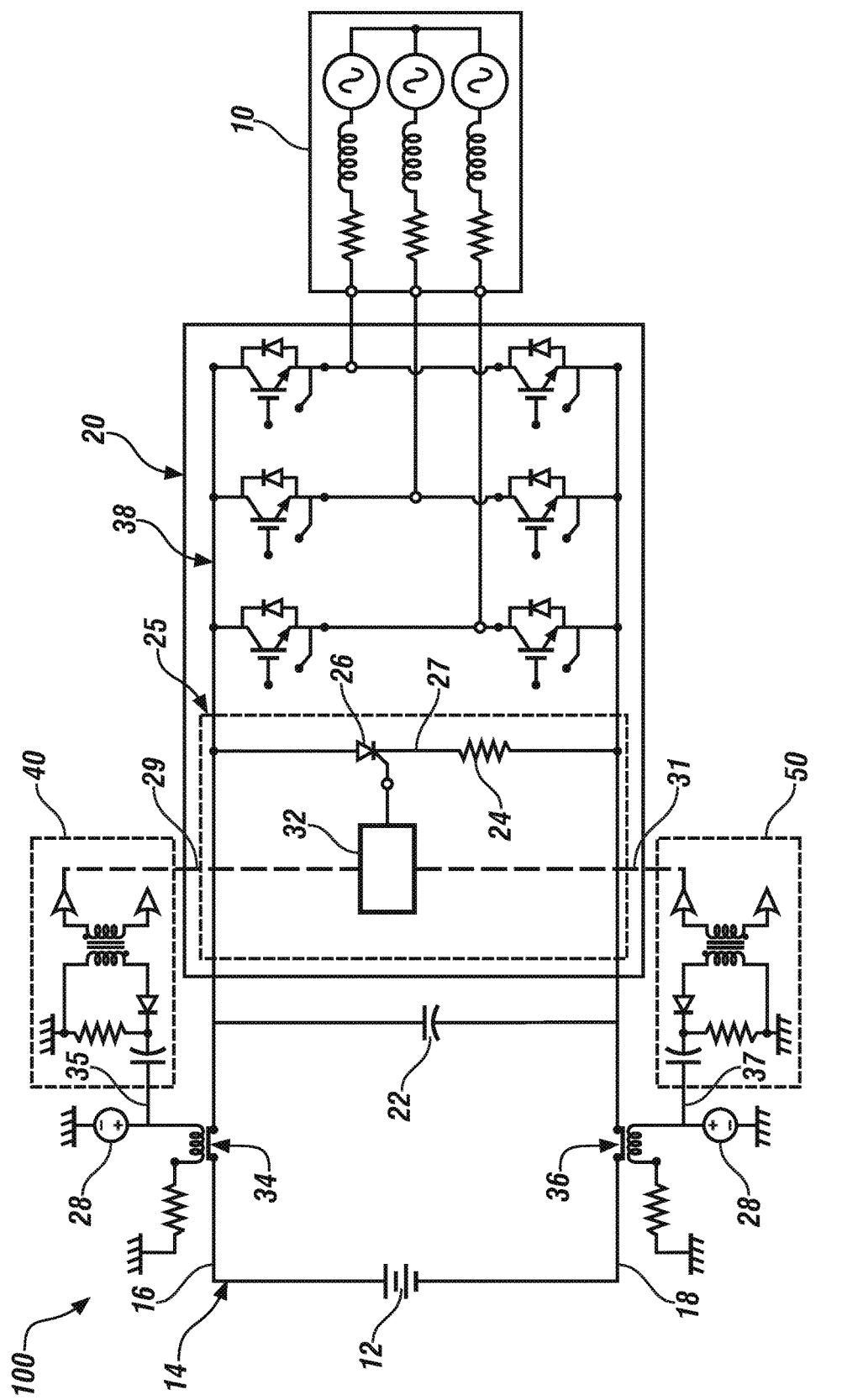
FIGS. 1, 2 and 3 schematically illustrate embodiments of a power inverter module including a passive discharge circuit for discharging electric power across a high-voltage bus, wherein the high-voltage bus is electrically connected between a high-voltage DC electric power source and the power inverter module, in accordance with the disclosure.

Referring now to the drawings, wherein the depictions are for the purpose of illustrating certain exemplary embodiments only and not for the purpose of limiting the same, FIG. 1 schematically illustrates one embodiment of a power inverter module 20 that includes a passive discharge circuit 25 for discharging electric power across a high-voltage bus 14, wherein the high-voltage bus 14 is electrically connected between a high-voltage DC electric power source 12 and the power inverter module 20. The power inverter module 20 may be an element of a first embodiment of a motor control system 100 that includes an electric machine 10 that is operatively controlled by the power inverter module 20 employing electric power from the high-voltage DC electric power source 12. In one non-limiting embodiment, the power inverter module 20 may be employed on a vehicle as an element of a propulsion system. Like numerals indicate like or corresponding parts throughout the several views.

The electric machine 10 may be a motor/generator or another suitable multi-phase electric machine, e.g., a permanent magnet device. The power inverter module 20 electrically connects to the high-voltage DC electric power source 12 via a positive conductor 16 and a negative conductor 18 of the high-voltage bus 14. The high-voltage bus 14 includes first and second contactors 34, 36, respectively, that are controllable to connect the respective positive and negative conductors 16, 18 of the high-voltage bus 14 to positive and negative sides of the high-voltage DC electric power source 12. The first contactor 34 preferably communicates with a first trigger circuit 40, and the second contactor 36 preferably communicates with a second trigger circuit 50. The power inverter module 20 includes a bulk capacitor 22 electrically arranged between the positive conductor 16 and the negative conductor 18 of the high-voltage bus 14.

The first and second contactors 34, 36 are inductively-controlled normally-open switch devices that operatively connect to an ignition switch 28 via a controller and a low-voltage battery. When the ignition switch 28 is in a key-OFF state, the first and second contactors 34, 36 are open, thus preventing electric power flow between the respective positive and negative conductors 16, 18 and the high-voltage DC electric power source 12. When the ignition switch 28 is in a key-ON state, the first and second contactors 34, 36 are closed, thus permitting electric power flow between the respective positive and negative conductors 16, 18 and the high-voltage DC electric power source 12.

The power inverter module 20 includes an inverter 38 that includes a plurality of switch pairs that electrically connect in series between the positive and negative conductors 16, 18 of the high-voltage bus 14. Each of the switches of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 10. Other elements of the power inverter module 20 preferably include a plurality of gate drive circuits and a controller, wherein the gate drive circuits control activation and deactivation of the switches in response to control signals, e.g., pulsewidth-modulated control signals, which originate from the controller. The power inverter module 20 includes other electrical components including capacitors, resistors and other electrical circuit components to accomplish functions related to electrical noise suppression, load balancing and the like.

The passive discharge circuit 25 is disposed between the positive conductor 16 of the high-voltage bus 14 and the negative conductor 18 of the high-voltage bus 14. The passive discharge circuit 25 includes a bi-stable switch 26, a low-impedance discharge resistor 24, and an electric circuit 32 that communicates with the first trigger circuit 40 and the second trigger circuit 50. In one embodiment, the electric circuit 32 includes a logic OR gate or another suitable device that accommodates a plurality of input signals, including a first activation signal 29 from the first trigger circuit 40, a second activation signal 31 from the second trigger circuit 50, and a plurality of other activation signals. The other activation signals may originate from a vehicle controller, a service controller, an accelerometer, an airbag deployment signal or another suitable source. The passive discharge circuit 25 may be responsive to operation in an uncontrolled generator (UCG) mode and may provide protection in the event of airbag deployment. The discharge circuit 25 may prevent inadvertent discharge of the high-voltage DC electric power source 12 which may otherwise be caused when the system is dropped or experiences a high g-force event when the ignition is off.

The bi-stable switch 26 electrically connects in series with the low-impedance discharge resistor 24 between the positive conductor 16 and the negative conductor 18. The bi-stable switch 26 may be a thyristor or another silicon-controlled rectifier that includes a gate element 27 in certain embodiments. The gate element 27 communicates with the first trigger circuit 40 and the second trigger circuit 50, preferably via the electric circuit 32 in certain embodiments. A thyristor is a solid-state semiconductor device having multiple layers of alternating N and P-type material that function as a bi-stable switch, conducting current when the gate receives a current trigger, and continuing to conduct current so long as the voltage across the device is not reversed. Other suitable bi-stable switch devices may be employed.

When the first and second contactors 34, 36 are both closed and the bi-stable switch 26 is opened, i.e., deactivated, there is no electric current flow through the low-impedance discharge resistor 24, and thus no latent or residual electric power loss. When either the first trigger circuit 40 or the second trigger circuit 50 generates a respective activation signal 29, 31, the low-impedance discharge resistor 24 of the passive discharge circuit 25 passively discharges electric power stored in the bulk capacitor 22, the power inverter module 20 and the electric machine 10 across the positive conductor 16 and the negative conductor 18 of the high-voltage bus 14. Either the first trigger circuit 40 or the second trigger circuit 50 may generate the respective activation signal 29, 31 when one of the first and second contactors 34, 36 is opened. Furthermore, the first trigger circuit 40 and the second trigger circuit 50 are electrically isolated from the power inverter module 20.

The first trigger circuit 40 includes a transformer or other inductive device that electrically connects to a signal line 35 electrically connected to a side of the first contactor 34 via a resistance-capacitance (RC) circuit and a diode. When the first contactor 34 is opened, e.g., in response to the ignition switch 28 changing to a key-OFF state, the signal line 35 changes from a discrete HIGH state to a discrete LOW state, which causes an inductive kickback in the first trigger circuit 40 that causes the activation signal 29. The activation signal is a short-term inductively-induced impulse signal that includes a change from a low- or zero-voltage state to a high-voltage state. The activation signal 29 is communicated via the electric circuit 32 to the gate element 27 of the bi-stable switch 26, thus activating the bi-stable switch 26. Activating the bi-stable switch 26 leads to electric power flow through the passive discharge circuit 25 to discharge electric power from the bulk capacitor 22, the power inverter module 20 and the electric machine 10. The second trigger circuit 50 is analogous to the first trigger circuit 40, and includes a transformer or other inductive device that electrically connects to a signal line 37 electrically connected to a side of the second contactor 36 via a resistance-capacitance (RC) circuit and a diode. When the second contactor 36 is opened, e.g., in response to the ignition switch 28 changing to a key-OFF state, the signal line 37 changes from a discrete HIGH state to a discrete LOW state, which causes an inductive kickback in the second trigger circuit 50 that causes an activation signal 31. The activation signal 31 is communicated via the electric circuit 32 to the gate element 27 of the bi-stable switch 26, thus activating the bi-stable switch 26. Activating the bi-stable switch 26 leads to electric power flow through the passive discharge circuit 25 to discharge the bulk capacitor 22. As such, the inductive solenoid energy of the first and/or second contactor 34, 36 supplies the driving force for the activation signal that activates the bi-stable switch 26 to discharge the bulk capacitor 22. The first and second trigger circuits 40, 50 may be electrically isolated and employ the inductive energy to generate respective activation signals 29, 31. The system can be tuned to allow for triggering of the bi-stable switch 26 from a single activation signal from one of the activation signals 29, 31 or, alternatively, may require activation signals through both of the activation signals 29, 31 to trigger the bi-stable switch 26.

The low-impedance discharge resistor 24 may be sized based upon the magnitude of the electric potential across the high-voltage bus 14 and a preferred or desired discharge time. The average power rating may be reduced to a rating that comprehends peak power capability, and thus differs from resistances of devices employed in an active system.

The discharge power, which drives the power rating of the low-impedance discharge resistor 24, may be determined based upon the magnitude of the electric potential across the high-voltage bus 14, the preferred or desired discharge time, and the capacitance of the bulk capacitor 22. The design parameters for the bi-stable switch 26 may be determined based upon the magnitude of the electric potential across the high-voltage bus 14, electrical current, the preferred discharge time, and the resistance of the low-impedance discharge resistor 24.

The concepts described herein include a passive discharge circuit 25 that consumes little or no electrical energy while permitting rapid, automatic discharge of electric potential in the high-voltage bus. The time period for rapid discharge may be less than five seconds in certain embodiments. The discharge circuit 25 may further prevent an over-discharge of the high-voltage DC electric power source 12 in a situation when the contactors 34, 36 become welded. The discharge circuit 25 may be responsive to operation in an uncontrolled generator (UCG) mode and may provide protection in the event of airbag deployment. The discharge circuit 25 may prevent inadvertent discharge of the high-voltage DC electric power source 12 which may otherwise be caused when the system is dropped or experiences a high g-force event when the ignition is off.

Figure 2:
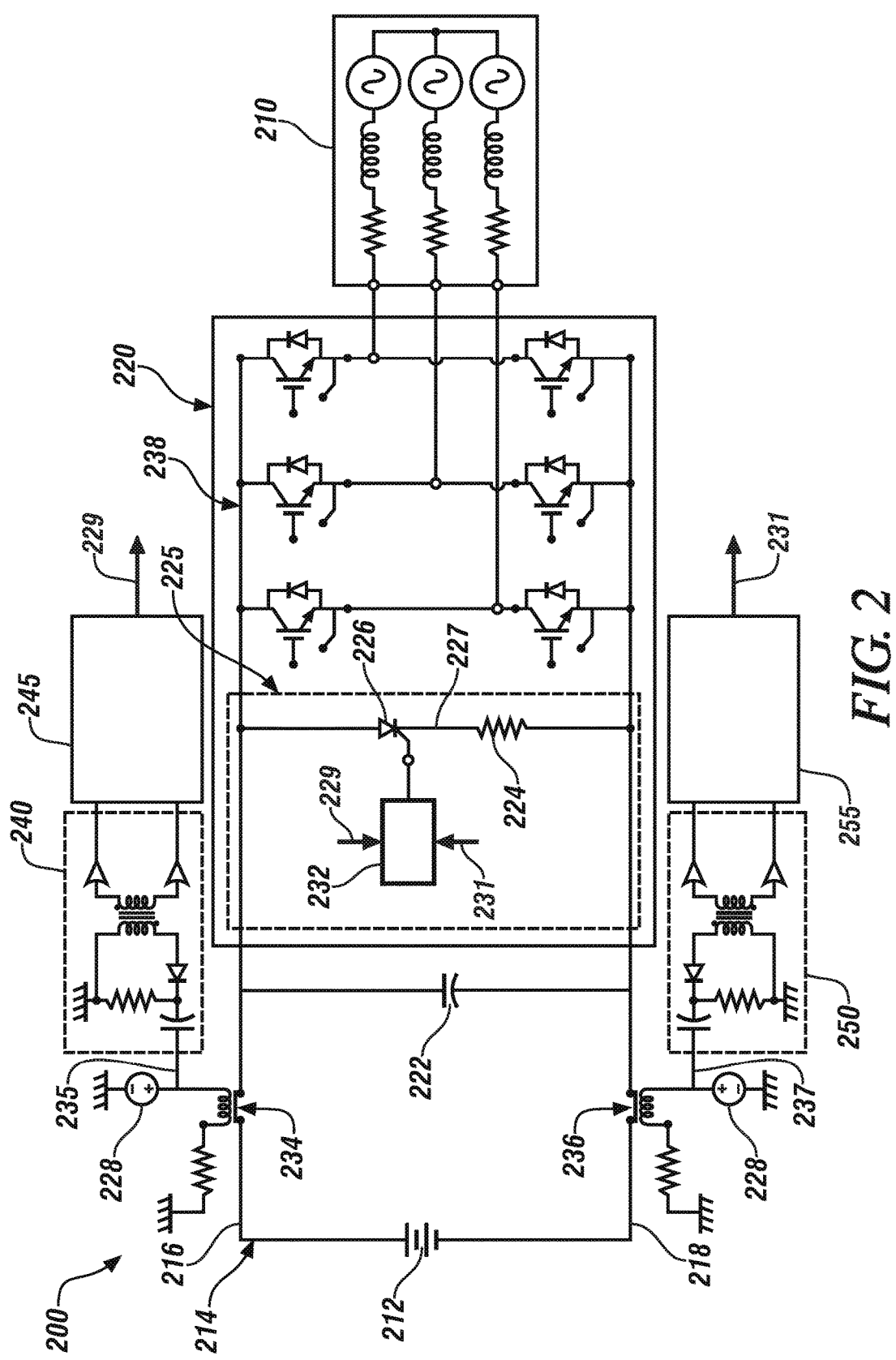

FIG. 2 schematically illustrates another embodiment of a power inverter module 220 that includes a passive discharge circuit 225 for discharging electric power across a high-voltage bus 214, wherein the high-voltage bus 214 is electrically connected between a high-voltage DC electric power source 212 and the power inverter module 220. The power inverter module 220 may be an element of an embodiment of a motor control system 200 that includes an electric machine 210 that is operatively controlled by the power inverter module 220 employing electric power from a high-voltage DC electric power source 212. The power inverter module 210 and motor control system 200 are analogous to those elements described with reference to FIG. 1.

The power inverter module 220 electrically connects to the high-voltage DC electric power source 212 via a positive conductor 216 and a negative conductor 218 of the high-voltage bus 214. The high-voltage bus 214 includes first and second contactors 234, 236, respectively, that are controllable to connect the respective positive and negative conductors 216, 218 of the high-voltage bus 214 to positive and negative sides of the high-voltage DC electric power source 212. The first contactor 234 preferably communicates with a first trigger circuit 240, and the second contactor 236 preferably communicates with a second trigger circuit 250. The power inverter module 220 includes a bulk capacitor 222 electrically arranged between the positive conductor 216 and the negative conductor 218 of the high-voltage bus 214. The first and second contactors 234, 236 are inductively-controlled normally-open switch devices that electrically connect to an ignition switch 228. When the ignition switch 228 is in a key-OFF state, the first and second contactors 234, 236 are open, and when the ignition switch 228 is in a key-ON state, the first and second contactors 234, 236 are closed. The power inverter module 220 includes an inverter 238 analogous to the inverter 38 described with reference to FIG. 1.

The passive discharge circuit 225 is disposed between the positive conductor 216 of the high-voltage bus 214 and the negative conductor 218 of the high-voltage bus 214. The passive discharge circuit 225 includes a bi-stable switch 226, a low-impedance discharge resistor 224, and an electric circuit 232 that communicates with the first trigger circuit 240 and the second trigger circuit 250.

The bi-stable switch 226 electrically connects in series with the low-impedance discharge resistor 224 between the positive conductor 216 and the negative conductor 218. The bi-stable switch 226 may be a thyristor or another silicon-controlled rectifier that includes a gate element 227 in certain embodiments. The gate element 227 communicates with the first trigger circuit 240 and the second trigger circuit 250, preferably via the electric circuit 232 in certain embodiments.

When the first and second contactors 234, 236 are both closed and the bi-stable switch 226 is closed, i.e., deactivated, there is no electric current flow through the low-impedance discharge resistor 224, and thus no latent or residual electric power loss. When either the first trigger circuit 240 or the second trigger circuit 250 generates a respective activation signal 229, 231, the low-impedance discharge resistor 224 of the passive discharge circuit 225 discharges electric energy in the bulk capacitor 222, the power inverter module 220 and the electric machine 210 across the positive conductor 216 and the negative conductor 218. The first trigger circuit 240 or the second trigger circuit 250 may generate the respective activation signal 229, 231 when one of the first and second contactors 234, 236 is opened.

The first trigger circuit 240 includes a transformer or other inductive device that has a first side that electrically connects to a signal line 235 electrically connected to a side of the first contactor 234 via a resistance-capacitance (RC) circuit and a diode. A second side of the transformer electrically connects to a one-shot multi-vibrator device 245, which communicates with the electric circuit 232. When the first contactor 234 is opened, e.g., in response to the ignition switch 228 changing to a key-OFF state, the signal line 235 changes from a discrete HIGH state to a discrete LOW state, which causes an inductive kickback in the first trigger circuit 240 that causes an impulse signal, which is input to the one-shot multi-vibrator device 245, which in turn generates an activation signal 229 having a discrete "1" or high-voltage state. The activation signal 229 is communicated via the electric circuit 232 to the gate element 227 of the bi-stable switch 226, thus activating the bi-stable switch 226. Activating the bi-stable switch 226 leads to electric power flow through the passive discharge circuit 225 to discharge the bulk capacitor 222.

The second trigger circuit 250 is analogous to the first trigger circuit 240, and includes a transformer or other inductive device that electrically connects to a signal line 237 electrically connected to a side of the second contactor 236 via a resistance-capacitance (RC) circuit and a diode. A second side of the transformer electrically connects to a one-shot multi-vibrator device 255, which communicates with the electric circuit 232. When the first contactor 234 is opened, e.g., in response to the ignition switch 228 changing to a key-OFF state, the signal line 237 changes from a discrete HIGH state to a discrete LOW state, which causes an inductive kickback in the second trigger circuit 250 that causes an impulse signal, which is input to the one-shot multi-vibrator device 255, which in turn generates an activation signal 231 having a discrete "1" or high-voltage state. The activation signal 231 is communicated via the electric circuit 232 to the gate element 227 of the bi-stable switch 226, thus activating the bi-stable switch 226. Activating the bi-stable switch 226 leads to electric power flow through the passive discharge circuit 225 to discharge the bulk capacitor 222, the power inverter module 220 and the electric machine 210. The first and second trigger circuits 240, 250 may be electrically isolated and generate the respective activation signals 229, 231. The system can be tuned to allow for triggering of the bi-stable switch 226 from a single one of the activation signals 229, 231 or, alternatively, may require signals through both of the activation signals 229, 231 to trigger the bi-stable switch 226.

Figure 3:
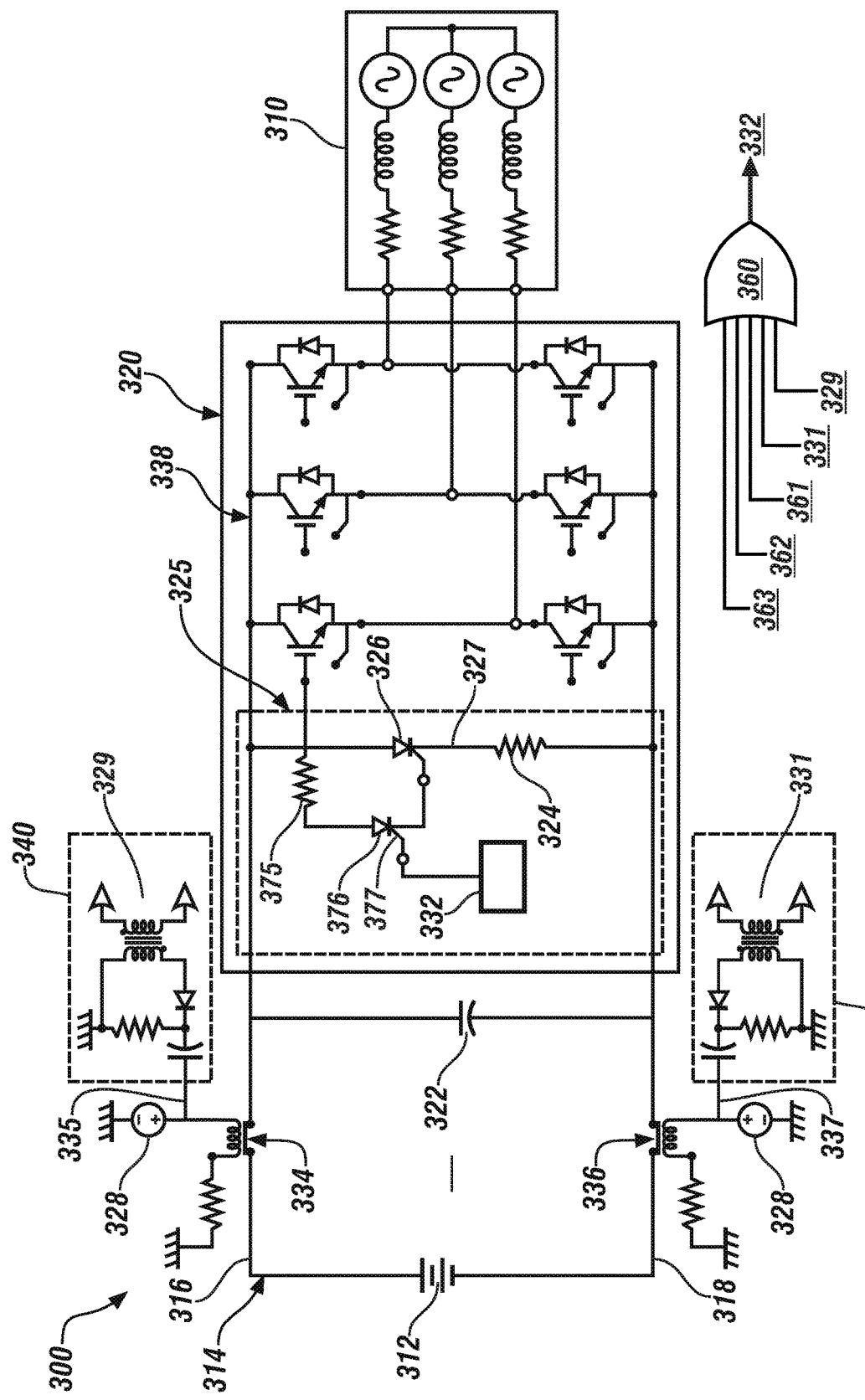

FIG. 3 schematically illustrates another embodiment of a power inverter module 320 that includes a passive discharge circuit 325 for discharging electric power across a high-voltage bus 314, wherein the high-voltage bus 314 is electrically connected between a high-voltage DC electric power source 312 and the power inverter module 320. The power inverter module 320 may be an element of an embodiment of a motor control system 300 that includes an electric machine 310 that is operatively controlled by the power inverter module 320 employing electric power from a high-voltage DC electric power source 312. The power inverter module 320 and motor control system 300 are analogous to those elements described with reference to FIG. 1.

The power inverter module 320 electrically connects to the high-voltage DC electric power source 312 via a positive conductor 316 and a negative conductor 318 of the high-voltage bus 314. The high-voltage bus 314 includes first and second contactors 334, 336, respectively, that are controllable to connect the respective positive and negative conductors 316, 318 of the high-voltage bus 314 to positive and negative sides of the high-voltage DC electric power source 312. The first contactor 334 preferably communicates with a first trigger circuit 340, and the second contactor 336 preferably communicates with a second trigger circuit 350. The power inverter module 320 includes a bulk capacitor 322 that is electrically arranged between the positive conductor 316 and the negative conductor 318 of the high-voltage bus 314. The first and second contactors 334, 336 are inductively-controlled normally-open switch devices that electrically connect to an ignition switch 328. When the ignition switch 328 is in a key-OFF state, the first and second contactors 334, 336 are open, and when the ignition switch 328 is in a key-ON state, the first and second contactors 334, 336 are closed. The power inverter module 320 includes an inverter 338 analogous to the inverter 38 described with reference to FIG. 1.

The passive discharge circuit 325 is disposed between the positive conductor 316 of the high-voltage bus 314 and the negative conductor 318 of the high-voltage bus 314. The passive discharge circuit 325 includes a first bi-stable switch 326, a low-impedance discharge resistor 324, and a limiting resistor 375 arranged in series with a second bi-stable switch 376 having a gate 377. The second bi-stable switch 376 includes an output line that connects with the gate 327 of the first bi-stable switch 326. The gate 377 of the second bi-stable switch 376 is connected to an electric circuit 332 that communicates with a trigger composite circuit 360. The bi-stable switch 326 electrically connects in series with the low-impedance discharge resistor 324 between the positive conductor 316 and the negative conductor 318. The first bi-stable switch 326 may be a thyristor or another silicon-controlled rectifier that includes a gate element 327 in certain embodiments. This embodiment offers a higher sensitive variant wherein the coils utilized in the contactors 334, 336 may be sized such that they lack sufficient energy to drive the gate element 327 of the first bi-stable switch 326. The second bi-stable switch 376, when activated, biases the first bi-stable switch 326, which finds its energy through the bulk capacitor 322.

The trigger composite circuit 360 is a logic OR gate or another suitable device that accommodates a plurality of input signals, including a first activation signal 329 from the first trigger circuit 340, a second activation signal 331 from the second trigger circuit 350, a third activation signal 361, a fourth activation signal 362 and a fifth activation signal 363. The third, fourth and fifth activation signals 361, 362, 363 may originate from a vehicle controller, a service controller, an accelerometer, or another suitable source. The discharge circuit 325 may be responsive to operation in an uncontrolled generator (UCG) mode and may provide protection in the event of airbag deployment. The discharge circuit 325 may prevent inadvertent discharge of the high-voltage DC electric power source 312 which may otherwise be caused when the system is dropped or experiences a high g-force event when the ignition is off.

When the first and second contactors 334, 336 are both closed and the bi-stable switch 326 is closed, i.e., de-activated, there is no electric current flow through the low-impedance discharge resistor 324, and thus no latent or residual electric power loss. When either the first trigger circuit 340 or the second trigger circuit 350 generates a respective activation signal 329, 331, or one of the third, fourth and fifth activation signals 361, 362, 363 generates a non-zero signal, the second bi-stable switch 376 is activated, which triggers the gate 327 of the first bi-stable switch 326, thus activating it. Activating the bi-stable switch 326 leads to electric power flow through the passive discharge circuit 325 to discharge the bulk capacitor 322, the power inverter module 320 and the electric machine 310. The first and second trigger circuits 340, 350 may be electrically isolated and generate the respective activation signals 329, 331. The system can be tuned to allow for triggering of the bi-stable switch 326 from a single one of the activation signals 329, 331 or, alternatively, may require signals through both of the activation signals 329, 331 to trigger the bi-stable switch 326. The first trigger circuit 340 or the second trigger circuit 350 may generate the respective activation signal 329, 331 when one of the first and second contactors 334, 336 is opened.

The first trigger circuit 340 includes a transformer or other inductive device that has a first side that electrically connects to a signal line 335 electrically connected to a side of the first contactor 334 via a resistance-capacitance (RC) circuit and a diode. A second side of the transformer electrically connects to the trigger composite circuit 360. When the first contactor 334 is opened, e.g., in response to the ignition switch 328 changing to a key-OFF state, the signal line 335 changes from a discrete HIGH state to a discrete LOW state, which causes an inductive kickback in the first trigger circuit 340 that causes an impulse signal, which in turn generates an activation signal 329 having a discrete "1" or high-voltage state.

The second trigger circuit 350 is analogous to the first trigger circuit 340, and includes a transformer or other inductive device that electrically connects to a signal line 337 electrically connected to a side of the second contactor 336 via a resistance-capacitance (RC) circuit and a diode. A second side of the transformer electrically connects to the trigger composite circuit 360. When the first contactor 334 is opened, e.g., in response to the ignition switch 328 changing to a key-OFF state, the signal line 337 changes from a discrete HIGH state to a discrete LOW state, which causes an inductive kickback in the second trigger circuit 350 that causes an impulse signal, which in turn generates an activation signal 331 having a discrete "1" or high-voltage state.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include analog, discrete or digitized analog signals representing inputs from sensors, signals representing actuator commands, and communication signals between controllers. The term 'model' refers to a processor-based or processor-executable code and associated calibration that simulates a physical existence of a device or a physical process. Additionally, it is noted that the term "signal" means a detectable physical quantity that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A power inverter electrically connected to a high-voltage DC power source via a high-voltage bus, the power inverter comprising:
   a multi-phase inverter circuit electrically connected to positive and negative conductors of the high-voltage bus;
   a bi-stable switch electrically connected in series with a discharge resistor between the positive and negative conductors of the high-voltage bus;
   a capacitor electrically connected between the positive and negative conductors of the high-voltage bus;
   first and second contactors;
   first and second trigger circuits, wherein each of the first and second trigger circuits includes an inductive device that electrically connects to a signal line that is electrically connected to the respective first or second contactor via a resistance-capacitance circuit and a diode, and wherein each of the inductive devices includes an output line that is connected via an electric circuit to a gate of the bi-stable switch;
   wherein the first and second contactors are controllable to electrically connect a respective one of the positive and negative conductors of the high-voltage bus to the high-voltage DC power source, wherein the first and second contactors are in communication with a respective one of the first and second trigger circuits;
   wherein the bi-stable switch is controllable to provide a low-impedance electric current flow path through the discharge resistor between the positive and negative conductors of the high-voltage bus in response to an activation signal that is communicated from one of the first and second contactors to the gate of the bi-stable switch via one of the first and second trigger circuits and the electric circuit.

2. The power inverter of claim 1, wherein the power inverter electrically connects to an electric machine.

3. The power inverter of claim 1, wherein the bi-stable switch comprises a silicon-controlled rectifier.

4. The power inverter of claim 1, wherein the bi-stable switch comprises a thyristor.

5. The power inverter of claim 1, wherein the discharge resistor comprises a resistor having an impedance that is selected to minimize time to discharge the capacitor.

6. The power inverter of claim 1, wherein the capacitor is electrically connected between the positive and negative conductors of the high-voltage bus in parallel with the bi-stable switch that is electrically connected in series with the discharge resistor.

7. The power inverter of claim 1, further comprising the bi-stable switch in an open-circuit state in response to closing both the first and second contactors.

8. The power inverter of claim 1, wherein the activation signal is generated in response to an opening of one of the first and second contactors.

9. The power inverter of claim 1, wherein the first and second contactors comprise respective first and second high-voltage DC contactors that are in communication with the respective one of the first and second trigger circuits.

10. The power inverter of claim 1, further comprising a pair of one-shot multi-vibrators, each connected to a respective output line of one of the first and second trigger circuits, wherein each of the one-shot multi-vibrators is connected via the electric circuit to the gate of the bi-stable switch.

11. The power inverter of claim 1, wherein the first and second contactors electrically isolate the respective first and second trigger circuits from the high-voltage bus of the multi-phase inverter circuit.

12. The power inverter of claim 1, wherein the activation signal comprises a short-term inductively-induced impulse signal that is communicated via the electric circuit to the gate element of the bi-stable switch.

13. A power inverter disposed to control an electric machine, the power inverter being electrically connected to a high-voltage DC power source via a high-voltage bus, the power inverter comprising:
   a multi-phase inverter circuit electrically connected to positive and negative conductors of the high-voltage bus;
   a capacitor electrically connected between the positive and negative conductors of the high-voltage bus;
   a passive discharge circuit disposed between the positive and negative conductors of the high-voltage bus;
   first and second contactors controllable to electrically connect a respective one of the positive and negative conductors of the high-voltage bus to the high-voltage DC power source, and the first and second contactors in communication with a respective one of the first and second trigger circuits; and
   first and second trigger circuits, wherein each of the first and second trigger circuits includes an inductive device that electrically connects to a signal line that is electrically connected to the respective first or second contactor via a resistance-capacitance circuit and a diode, wherein each of the inductive devices includes an output line that is connected via an electric circuit to the passive discharge circuit;
   wherein the passive discharge circuit is controllable to provide an electric current flow path between the positive and negative conductors of the high-voltage bus in response to an activation signal to the positive discharge circuit that is communicated from one of the first and second contactor circuits via one of the first and second trigger circuits and the electric circuit.

14. The power inverter of claim 13, wherein the passive discharge circuit comprises a bi-stable switch electrically connected in series with a discharge resistor between the positive and negative conductors of the high-voltage bus.

15. The power inverter of claim 13, wherein the passive discharge circuit comprises a bi-stable switch electrically connected in series with a discharge resistor between the positive and negative conductors of the high-voltage bus, wherein the bi-stable switch is in communication with the first and second trigger circuits.

16. The power inverter of claim 13, wherein the passive discharge circuit comprises:
   a first bi-stable switch electrically connected in series with a discharge resistor between the positive and negative conductors of the high-voltage bus; and
   a second bi-stable switch electrically connected between the positive conductor of the high-voltage bus and a gate of the first bi-stable switch;
   wherein a gate of the second bi-stable switch is in communication with the first and second trigger circuits.

17. The power inverter of claim 13, wherein the first and second trigger circuits are electrically isolated from the high-voltage bus of the multi-phase inverter circuit.

* * * * *